US 8,893,368 B2

(12) United States Patent
Williams et al.

(10) Patent No.: US 8,893,368 B2
(45) Date of Patent: Nov. 25, 2014

(54) PIVOT JOINT ASSEMBLY

(75) Inventors: Jey Williams, Bristol (GB); Colin West, Pontypridd (GB)

(73) Assignee: Airbus Operations Limited, Bristol (GB)

( * ) Notice: Subject to any disclaimer, the term of this patent is extended or adjusted under 35 U.S.C. 154(b) by 227 days.

(21) Appl. No.: 13/525,459

(22) Filed: Jun. 18, 2012

(65) Prior Publication Data
US 2012/0324707 A1    Dec. 27, 2012

(30) Foreign Application Priority Data
Jun. 21, 2011    (GB) .................................. 1110483.3

(51) Int. Cl.
| B23P 11/00 | (2006.01) |
| F16J 15/32 | (2006.01) |
| B64C 25/10 | (2006.01) |
| F16C 11/06 | (2006.01) |

(52) U.S. Cl.
CPC ................................. F16C 11/0614 (2013.01)
USPC ............. 29/434; 277/634; 277/635; 403/288; 244/102 A; 244/102 R; 29/441.1

(58) Field of Classification Search
CPC .... B64C 25/10; B64C 25/14; B64C 2025/10; B64C 2025/125; B64F 2700/623; F16J 3/02
USPC ......... 29/434, 441.1; 244/102 R, 102 A, 109, 244/100 R; 277/634, 635, 636; 403/288
See application file for complete search history.

(56) References Cited

U.S. PATENT DOCUMENTS

| 2,747,817 | A | * | 5/1956 | Saulnier ........................... 244/50 |
| 4,298,206 | A | * | 11/1981 | Kojima ........................... 277/626 |
| 5,649,709 | A | * | 7/1997 | Munekata et al. ............. 277/560 |
| 6,016,995 | A | * | 1/2000 | Squires et al. ............. 244/102 R |
| 6,273,364 | B1 | * | 8/2001 | Tizac et al. ................ 244/100 R |
| 6,471,595 | B1 | * | 10/2002 | Neviani ......................... 464/175 |

(Continued)

FOREIGN PATENT DOCUMENTS

| EP | 1371553 A1 * | 12/2003 | ............. B64C 25/04 |
| EP | 1669647 A1 | 6/2006 | |
| FR | 2840585 A1 * | 12/2003 | ............. B64C 25/04 |
| WO | 2006081664 A1 | 8/2006 | |

OTHER PUBLICATIONS

Search Report corresponding to GB 1110483.3, dated Oct. 4, 2011.

*Primary Examiner* — Essama Omgba
(74) *Attorney, Agent, or Firm* — Lowe Hauptman & Ham, LLP

(57) ABSTRACT

A pivot joint assembly has a first part with a hole. A pivot pin passes through the hole. A second part is carried by the pivot pin to be rotatable relative to the first part. A bush has an annular sleeve with an inner face engaging the pivot pin and an outer face engaging a bore wall of the first part. A sealing ring between the bush and the first part. The sealing ring has a body attached to the first part, and a sealing member extending away from the body in a radial direction to a sealing lip which engages the bush without being attached thereto. The sealing member is resiliently compressed to urge the sealing lip towards the bush to maintain engagement with the bush in the event that the bush moves away from the body in the radial direction.

15 Claims, 8 Drawing Sheets

(56) References Cited

U.S. PATENT DOCUMENTS

| | | | |
|---|---|---|---|
| 6,547,669 B1 * | 4/2003 | Neviani | 464/175 |
| 6,938,902 B2 * | 9/2005 | Devers | 277/634 |
| 6,945,496 B2 * | 9/2005 | Reniau | 244/100 R |
| 7,458,725 B2 | 12/2008 | Katae | |
| 7,798,497 B2 * | 9/2010 | Wagner et al. | 277/634 |
| 7,861,535 B2 * | 1/2011 | Figueroa et al. | 60/796 |
| 8,002,287 B2 * | 8/2011 | Wagner | 277/551 |
| 8,157,657 B2 * | 4/2012 | LaMothe et al. | 464/145 |
| 8,313,107 B2 * | 11/2012 | Hoets et al. | 277/634 |
| 8,424,398 B2 * | 4/2013 | Wagner et al. | 73/866.5 |
| 8,567,717 B2 * | 10/2013 | Nannoni et al. | 244/102 R |
| 2003/0102638 A1 * | 6/2003 | Iwano | 277/634 |
| 2005/0116097 A1 * | 6/2005 | Reniau | 244/100 R |
| 2005/0173869 A1 * | 8/2005 | Wagner | 277/602 |
| 2006/0022412 A1 | 2/2006 | Brock et al. | |
| 2007/0241518 A1 * | 10/2007 | Dice et al. | 277/635 |
| 2008/0012234 A1 * | 1/2008 | Wagner | 277/313 |
| 2008/0231002 A1 * | 9/2008 | Wagner et al. | 277/634 |
| 2009/0146383 A1 * | 6/2009 | Yamamoto et al. | 277/634 |

* cited by examiner

PIVOT JOINT ASSEMBLY

RELATED APPLICATIONS

The present application is based on, and claims priority from, British Application Number 1110483.3, filed Jun. 21, 2011, the disclosure of which is hereby incorporated by reference herein in its entirety.

FIELD OF THE INVENTION

The present invention relates to a pivot joint assembly comprising a first part with first and second side walls and a hole passing through the first part between the side walls, the exterior of the hole being defined by a bore wall; a pivot pin passing through the hole, the pivot pin defining a pivot axis; a second part which is carried by the pivot pin wherein the first or second part can rotate relative to the other part about the pivot axis; a bush comprising an annular sleeve with an inner face which engages the pivot pin and an outer face which engages the bore wall of the first part; and a sealing ring for preventing the ingress of contaminants between the bush and the first part.

BACKGROUND OF THE INVENTION

In conventional pivot joints assemblies of this type, the sealing ring comprises a fillet of sealant material such as polysulphide which is applied as a liquid and then allowed to cure so that it adheres to both the bush and the first part via respective adhesive interfaces. A problem with this arrangement is that if the bush moves relative to the first part, then one or both of the adhesive interfaces may fail, permitting the ingress of contaminants between the bush and the first part. This is a particular problem in a joint where the pivot pin is subject to very high loads, such as in a pintle joint of an aircraft landing gear.

SUMMARY OF THE INVENTION

A first aspect of the invention provides a pivot joint assembly comprising a first part with first and second side walls and a hole passing through the first part between the side walls, the exterior of the hole being defined by a bore wall; a pivot pin passing through the hole, the pivot pin defining a pivot axis; a second part which is carried by the pivot pin wherein the first or second part can rotate relative to the other part about the pivot axis; a bush comprising an annular sleeve with an inner face which engages the pivot pin and an outer face which engages the bore wall of the first part and a sealing ring for preventing the ingress of contaminants between the bush and the first part, wherein the sealing ring has a body which is attached to the first side wall of the first part, and a sealing member which extends away from the body in a radial direction towards the pivot axis to a sealing lip which engages the bush without being attached to it, and wherein the sealing member is in a state of resilient compression so that it urges the sealing lip towards the bush and can expand away from the body in the radial direction to maintain engagement with the bush in the event that the bush moves away from the body in the radial direction. A second aspect of the invention provides a method of assembling a pivot joint assembly comprising the steps of providing a first part with first and second side walls and a hole passing through the first part between the side walls, the exterior of the hole being defined by a bore wall; passing a pivot pin through the hole, the pivot pin defining a pivot axis; providing a second part which is carried by the pivot pin wherein the first or second part can rotate relative to the other s art about the s ivot axis providing a bush comprising an annular sleeve with an inner face which engages the pivot pin and an outer face which engages the bore wall of the first part and attaching a body of a sealing ring to the first side wall of the first part, the sealing ring comprising a sealing member which extends away from the body in a radial direction towards the pivot axis to a sealing lip which engages the bush without being attached to it placing the sealing member in a state of resilient compression so that it urges the sealing lip towards the bush and can expand away from the body in the radial direction to maintain engagement with the bush in the event that the bush moves away from the body in the radial direction.

In a preferred embodiment the sealing member comprises a folded part which forms a ridge between the body portion and the sealing lip and a groove between the ridge and the first side of the wall. The ridge and groove flatten as the sealing member expands towards the pivot axis. Optionally the folded part may comprise two or more ridges and two or more associated grooves (which expand and contract in the manner of a concertina).

As well as being able to expand axially, preferably the sealing member can also bend away from the first side wall of the first part to maintain engagement with the bush in the event that the bush moves relative to the body in an axial direction parallel with the pivot axis. This may be achieved in a number of ways, for instance:

by providing the sealing member with a folded part which forms a ridge between the body portion and the sealing lip and a groove between the ridge and the first side of the wall, wherein the ridge and groove flatten as the sealing member expands towards the pivot axis and wherein the folded part can bend away from the first side wall of the first part;

by providing the sealing member with an elongate shape which can bend along its length; and/or by providing the sealing member with a hinge (for instance by forming a narrow waist in the sealing member between the body and the sealing lip).

Alternatively the sealing member can maintain a sliding contact with the bush to maintain engagement with the bush in the event that the bush moves relative to the body in an axial direction parallel with the pivot axis.

Preferably the sealing lip can maintain a sliding contact with the bush in the event that the bush moves relative to the body in an axial direction parallel with the pivot axis and/or in a circumferential direction around the pivot axis.

The sealing member may engage the sleeve of the bush. However more typically the bush has a flange which extends away from the sleeve and the pivot axis towards an end face, the flange engages the first wall of the first part, and the sealing member engages the end face of the flange of the bush without being attached to it.

Optionally a secondary sealing ring, such as an O-ring, may be provided between the flange and the first wall of the first part.

In general terms the first or second part can rotate relative to the other part about the pivot axis. This may be achieved in a number of ways including:

the bush acting as a bearing between the first part and the pivot pin which permits the first part to rotate relative to the pivot pin;

the bush acting as a bearing between the first part and the pivot pin which permits the pivot pin carrying the second part to rotate relative to the first part;

providing a bearing (which may optionally be a spherical bearing) between the second part and the pivot pin which permits the second part to rotate on the bearing relative to the pivot pin;

providing a bearing (which may optionally be a spherical bearing) between the second part and the pivot pin which permits the pivot pin carrying the first part to rotate on the bearing relative to the second part.

The body of the sealing ring may be attached to the first side wall by fasteners such as bolts or rivets, but more preferably it is bonded to the first side wall. A bonded attachment is more preferred since it can act as a secondary seal. Optionally the body may be both bonded to the first side wall and attached to it by fasteners. The body may be bonded to the first side wall by co-bonding, co-curing, or more preferably by a layer of adhesive (i.e. secondary bonding).

The sealing member may engage the first side wall but this is not preferred since it will result in an undesirable frictional force between them as the sealing member expands. Therefore preferably a gap is provided between the sealing member and the first side wall.

Preferably the first side wall is formed with a counterbore with a base and a step; the body portion is attached to the first side wall outside the counterbore; the sealing member extends away from the body across the step; and a gap is present between the sealing member and the base of the counterbore. Preferably the sealing member does not engage the first side wall outside the counterbore.

Typically the first side wall of the first part faces towards the second part and the second side wall of the first part faces away from the second part. Alternatively the first side wall of the first part (which engages the sealing ring) may face away from the second part.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
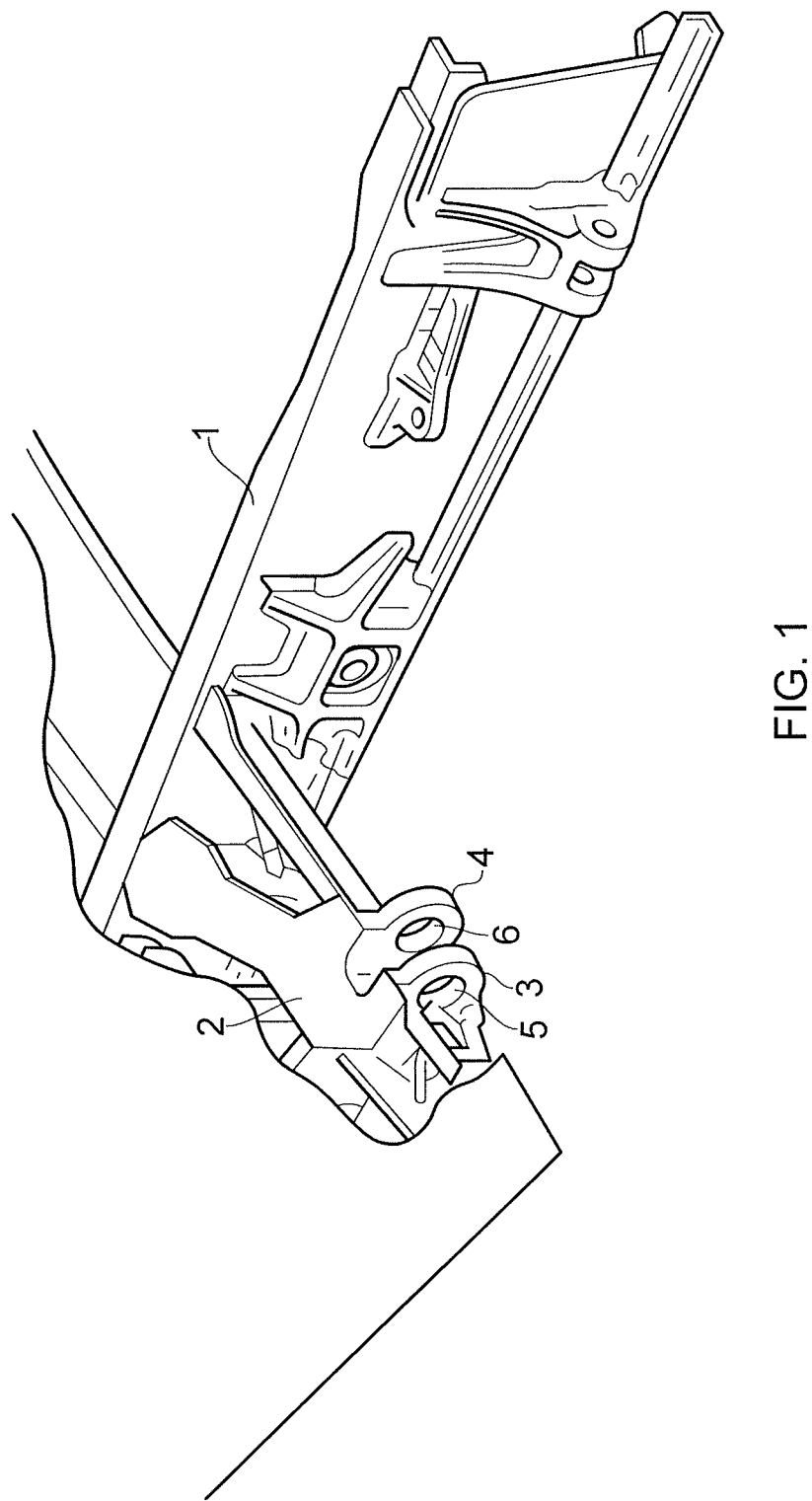
FIG. 1 shows part of the trailing edge of an aircraft wing.

FIG. 1 shows part of the trailing edge of an aircraft wing. The wing comprises a front spar 1 which extends along the length of the wing. The spar carries a rib 2 with an aft lug 3 and forward lug 4, each lug having a hole 5, 6 passing through it. A landing gear (not shown) is carried on a leg 10 (omitted from FIG. 1 but shown in FIG. 2) and the leg 10 is pivotally mounted to the rib 2 by a pivot joint assembly shown in FIG. 2.

Figure 2:
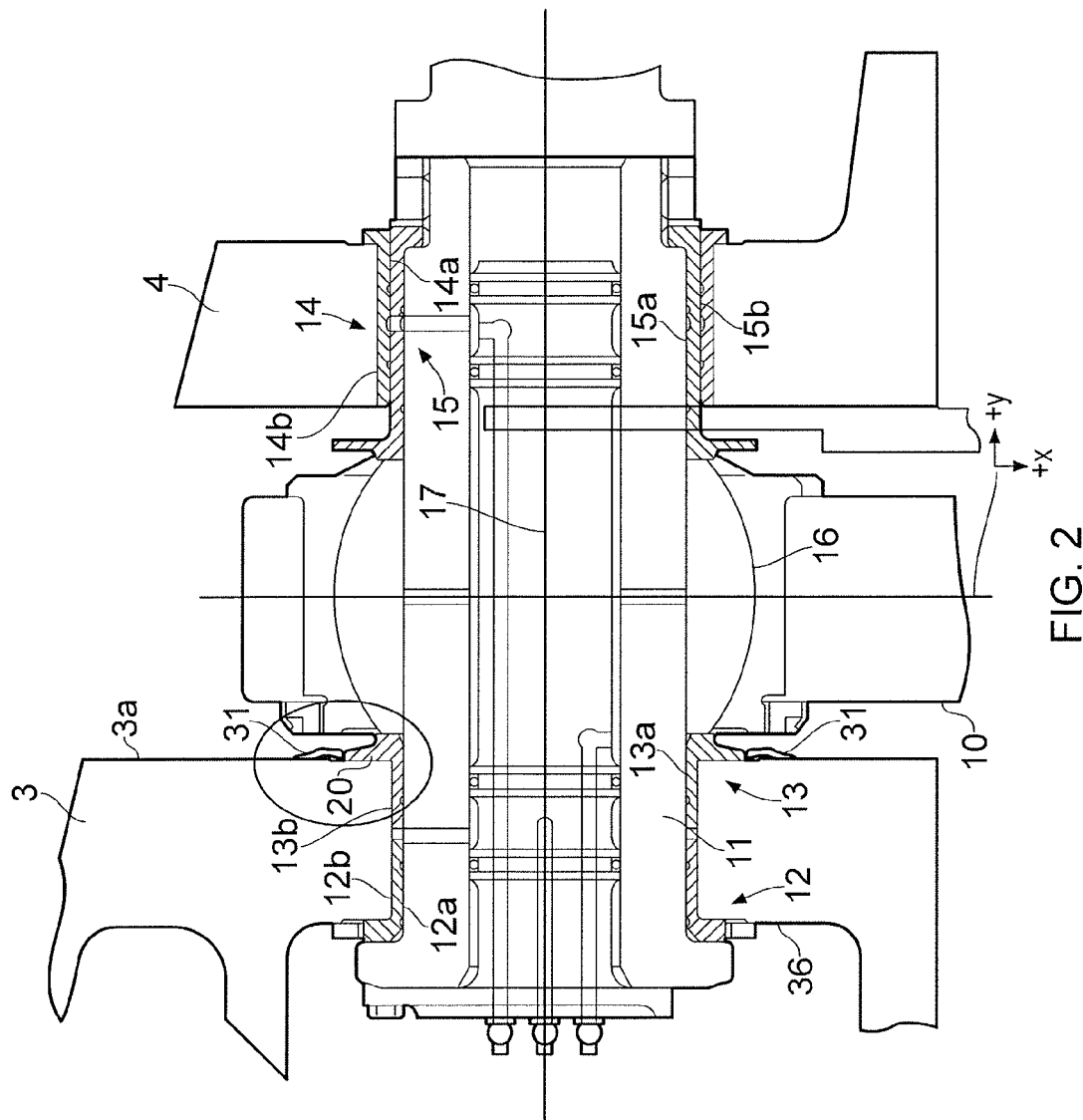
FIG. 2 is a sectional view of a landing gear pintle joint.

A pintle 11 passes through the holes in the lugs 3, 4. The pintle defines a pivot axis 17 about which the leg 10 rotates. An X/Y frame of reference is shown in FIGS. 2 and 3, with the Y-axis lying parallel with the pivot axis 17 and the X-axis lying at a right angle to the pivot axis 17 and oriented in the same direction as the leg 10.

Various bronze bushes provide load-bearing interfaces between the pintle 11 and the lugs 3, 4. The bushes are freeze-fitted to the lugs 3,4 so in normal operation they will not rotate relative to the lugs 3,4. Two split bushes 12, 13 provide a load-bearing interface between the pintle 11 and the lug 3. The bush 12 comprises an annular sleeve with an inner face 12a which engages the pintle 11 and an outer face 12b which engages the bore wall of the hole 5 in the lug 3. Similarly the bush 13 comprises an annular sleeve with an inner face 13a which engages the pintle 11 and an outer face 13b which engages the bore wall of the hole 5 in the lug 3. Two nested bushes 14, 15 provide a load-bearing interface between the pintle 11 and the lug 4. The bush 14 comprises an annular sleeve with an inner face 14a which engages the bush 15 and an outer face 14b which engages the bore wall of the hole 6 in the lug 4. The bush 15 is nested within the bush 14 and comprises an annular sleeve with an inner face 15a which engages the pintle and an outer face 15b which engages the inner face 14a of the bush 14.

The landing gear leg 10 is carried by the pintle 11 on a spherical bearing 16 which permits the leg 10 to rotate relative to the pintle 11 about the pivot axis 17 for gear retraction and extension. For misalignments and to stop unwanted load pickup, the spherical bearing 16 also provides a degree of freedom for the leg 10 to rotate around the Z-axis (which extends orthogonally to the X and Y axes shown in FIGS. 2 and 3). The pintle 11 does not rotate relative to the lugs 3, 4.

Figure 3:
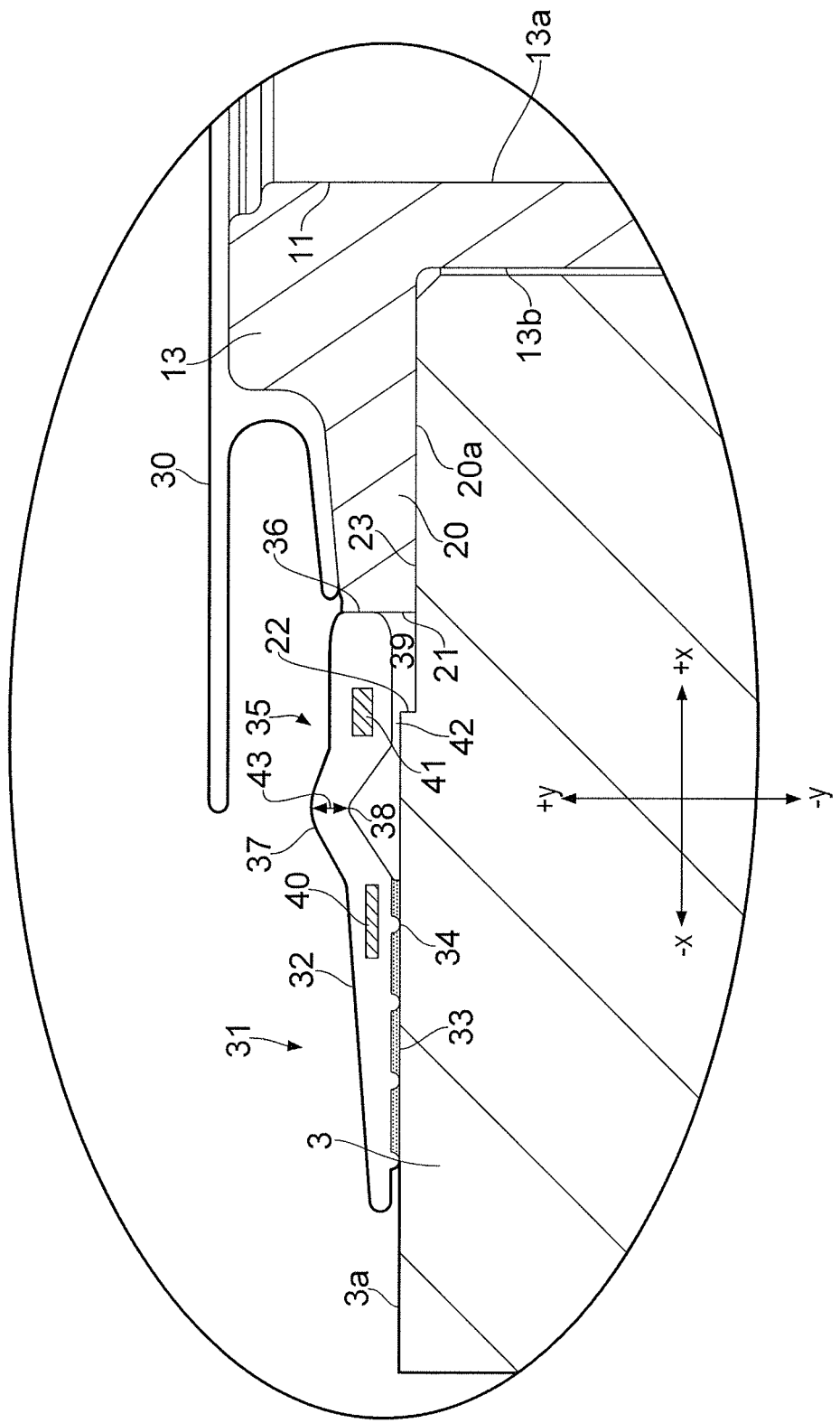
FIG. 3 is an enlarged sectional view showing the sealing ring.

The bush 13 has a flange 20 which is shown in detail in FIG. 3. The flange 20 extends radially away from the sleeve 13a, 13b towards an end face 21. The lug 3 has a pair of side walls 3a, 3b on either side. The wall 3a is machined with a counterbore with a step 22 and a base 23, and the flange 20 has an inner face 20a which engages the base 23 of the counterbore. A dust seal 30 is fitted over the bush 13 and pintle 11 to prevent the ingress of contaminants between them.

A sealing ring 31 is also provided to prevent the ingress of contaminants such as water, fuel, hydraulic fluid, electrolyte or dust between the bush 13 and the lug 3. The sealing ring has an annular body 32 which is bonded to the side wall 3a of the lug 3 outside the counterbore 22, 23 by an adhesive layer 33. The body 32 has four annular ribs 34 which ensure that the adhesive layer 33 has a known minimum thickness, and provide an additional barrier to ingress of contaminants.

The sealing ring 31 also has a sealing member 35 which extends away from the body 32 to a sealing lip 36 which engages the end face 21 of the flange 20 of the bush without being bonded or otherwise attached to it. Optionally a recess may be provided in the end face 21 to receive the sealing lip 36. The sealing member 35 extends away from the body 32 across the step 22, and a gap 39 is present between the sealing member and the base 23 of the counterbore. Note that the sealing member 35 also does not engage the first side wall 3a outside the counterbore so there is a small gap 42 between them.

The sealing member 35 has a folded portion which is folded to form a ridge 37 on one side and a groove 38 on the other. The folded portion enables the sealing member 35 to expand/contract resiliently in the positive/negative radial directions +/−X (i.e. towards/away from the pivot axis 17) in the manner of a bellows or concertina with the ridge 37 and groove 38 becoming progressively flattened as the sealing member expands. The folded portion is in a state of resilient compression so that it urges the sealing lip 36 towards the bush and can relax away from the body 32 towards the pintle 11 in the positive radial direction +X to maintain engagement with the bush in the event that the bush distorts (for instance during a hard landing of the aircraft) and in doing so moves away from the body in that positive radial direction +X.

As well as expanding/contracting in the radial direction +/−X, the sealing member can also bend away the side wall 3a, 23 (in the positive axial direction +Y) or towards the base 23 of the counterbore (in the negative axial direction −Y) to maintain engagement with the bush 13 in the event that the bush distorts (for instance during a hard landing of the aircraft) and in doing so moves relative to the lug in the axial direction. Alternatively, because the sealing lip 36 is not bonded or otherwise attached to the end face 21, the face 21 can maintain a sliding contact with the sealing lip 36 in the event that it moves in the axial direction. In this case the sealing member is not required to bend towards or away from the side wall to maintain contact.

The radial expansion/contraction and axial bending motion of the sealing member are assisted by forming a narrow waist at the apex of the ridge 37 with a reduced thickness 43 which acts as a "living hinge".

Furthermore, because the sealing lip 36 is not bonded or otherwise attached to the end face 21, the face 21 can maintain a sliding contact with the sealing lip 36 in the event that the bush rotates about the pivot axis 17 so that it moves in a circumferential direction (in or out of the plane of the section of FIG. 3).

The body 32 and sealing member 35 are formed by moulding as a single piece. The material used to form the body 32 and sealing member 35 is typically an elastomer such as polyurethane rubber or fluorosilicone rubber. The adhesive 33 is chosen to form a secure bond and may be for example a polysulphide sealant with a bond strength greater than 3.5 MPa.

The body 32 and sealing member 35 contain metallic or plastic interleaf reinforcement rings 40, 41 on either side of the folded portion 37, 38. The ring 40 aids handling of the sealing ring and ensures that flex occurs at the folded portion 37, 38 and thus protects the body 32 from peeling away from the lug 3. The ring 41 aids handling and maintains the gap 42 between the sealing member 35 and the wall 3a. This gap 42 prevents the sealing member 35 from catching on the corner where the step 22 meets the wall 3a.

Figure 4:
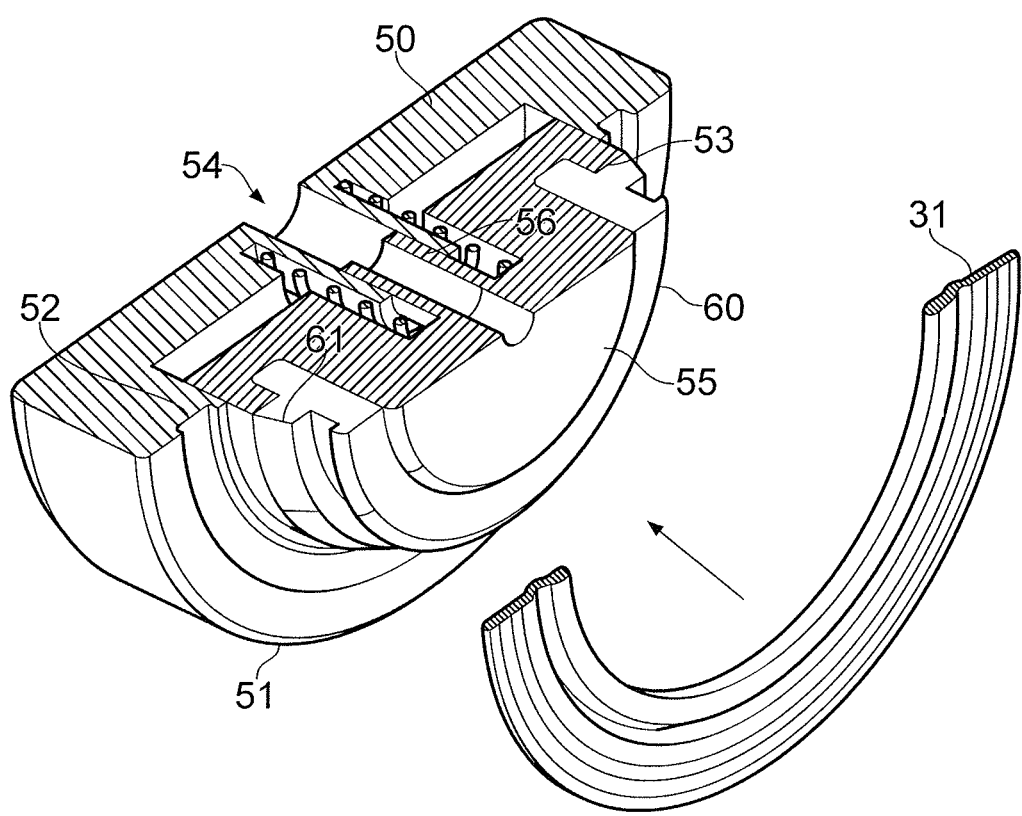
FIG. 4 is a perspective view, partly in section, of the sealing ring being mounted on an insertion tool.
Figure 5:
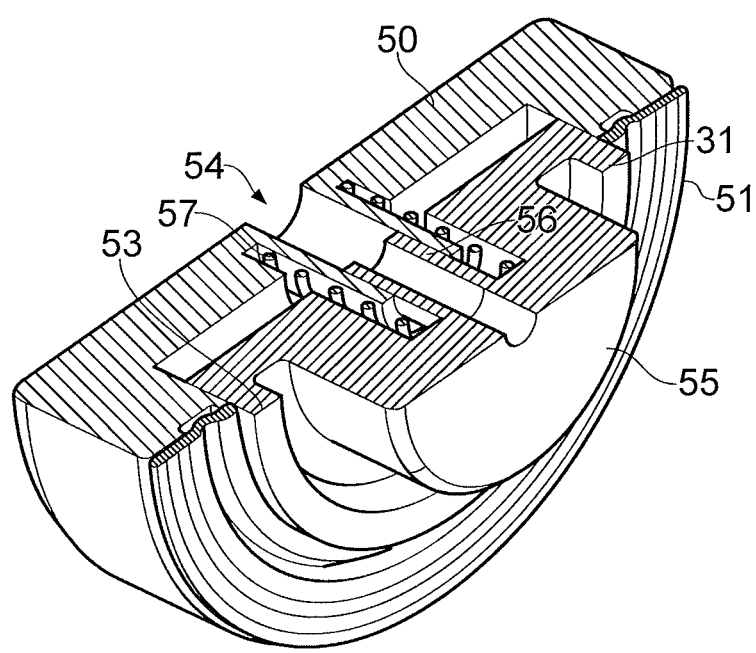
FIG. 5 is a perspective view, partly in section, of the sealing ring mounted on the insertion tool with the guide piece removed.
Figure 6:
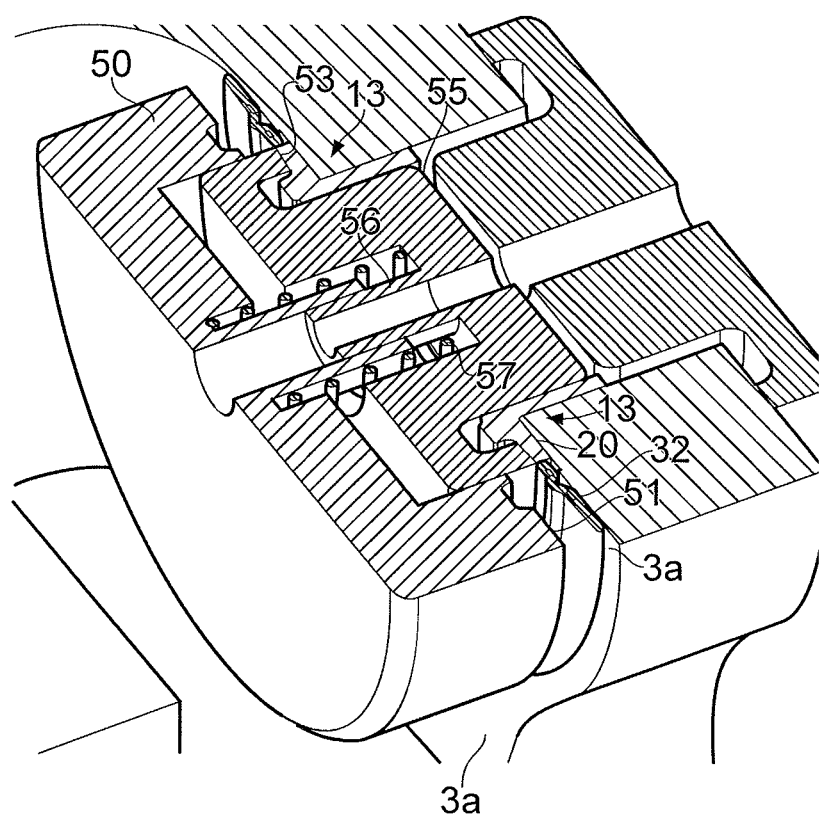
FIG. 6 is a perspective view, partly in section, of the sealing ring being attached to the lug with the insertion tool.

FIGS. 4-6 illustrate a preferred method of mounting the sealing ring 31 with an insertion tool. The insertion tool has a first part 50 with a bore 54 and an annular flange 51. A second part 55 has a rod 56 which is slidably received in the bore 54. A spring 57 acts between the parts 50, 55 and is shown in its relaxed position in FIGS. 4-6. The second part carries a guide piece 60 shown in FIG. 4 only.

In a first step shown in FIG. 4, the sealing ring 31 is stretched over the guide piece 60 and onto the tool. In its relaxed state shown in FIG. 4, the inner diameter of the ring 31 is less than the outer diameter of the guide piece 60. Thus the ring 31 first engages a frustoconical surface 61 of the guide piece 60, and then as it is pushed further the surface 61 forces the inner diameter 31 of the ring to increase evenly by flexure of the folded portion 37, 38. The guide piece 60 is then removed leaving the ring in place on the insertion tool as shown in FIG. 5. In its installed state the ring is in circumferential tension and compressed radially due to the flexure of the folded portion 37, 38.

Adhesive is then applied to the annular body 32 of the sealing ring, and the second part 55 of the insertion tool is inserted into the bush 13 as shown in FIG. 6 until the flange 53 of the part 55 engages the flange 20 of the bush 13. The first part 50 of the insertion tool is then pushed against the force of the spring 57 until the body 32 of the sealing ring is pressed against the wall 3a. The first part 50 is then held in place against the spring tension for three hours by a screw clamp (not shown—comprising a large nut and bolt through the assembly) during which time the adhesive cures and the seal is protected. The first part 50 is then released which causes it to spring back to the position shown in FIG. 6, leaving the sealing ring adhered in place. The insertion tool is then removed.

Figure 7:
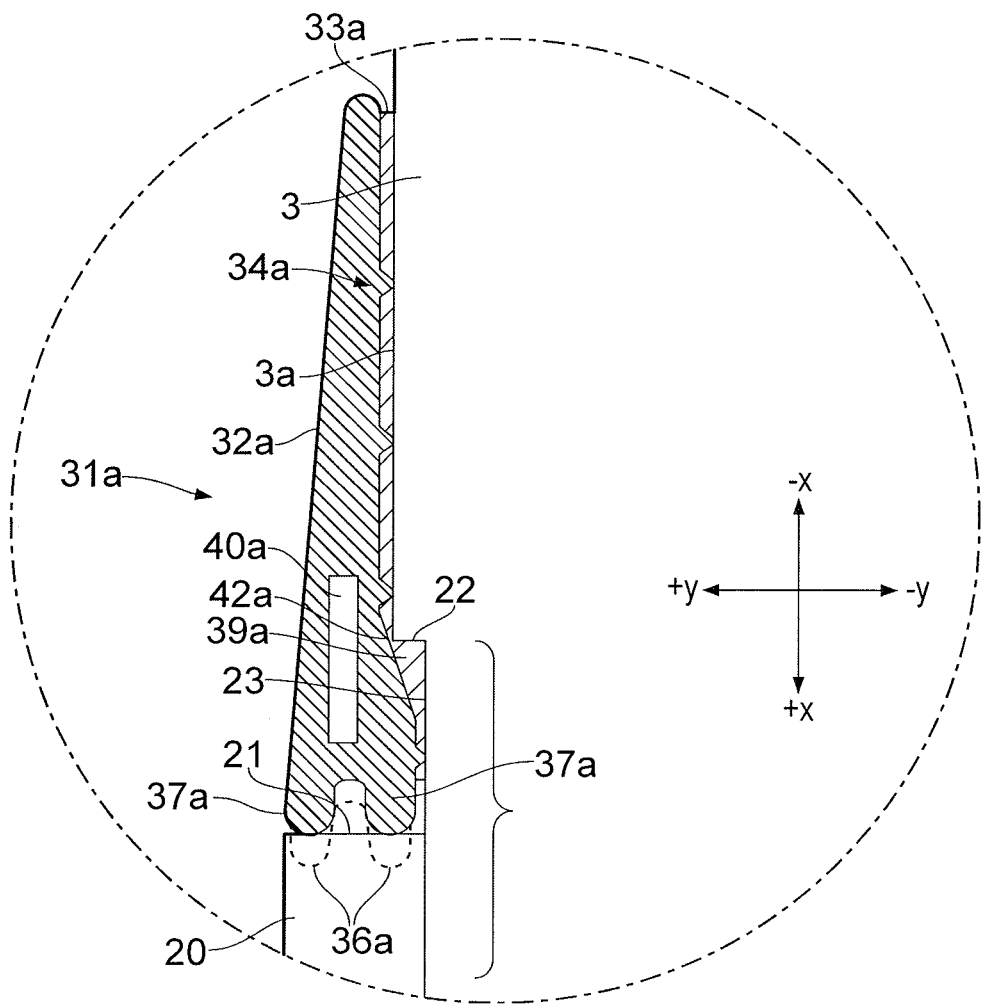
FIG. 7 is a sectional view of a sealing ring according to a second embodiment of the invention.

FIG. 7 is a sectional view of a sealing ring 31a according to a second embodiment of the invention. The sealing ring has an annular body 32a which is bonded to the side wall 3a of the lug 3 outside the counterbore 22, 23 by an adhesive layer 33a and to the counterbore 23 by an adhesive layer 39a. The body 32a has four annular ribs 34a which ensure that the adhesive layers 33a and 39a have a known minimum thickness.

The sealing ring 31a has a pair of annular sealing members 37a which extend radially away from the body 32a. Each sealing member 37a has a respective sealing lip 36a which engages the end face 21 of the flange 20 of the bush without being attached to it.

The pair of sealing members 37a are shown in solid lines in their compressed state, and in dashed lines in their relaxed state. Thus the sealing members 37a can expand/contract resiliently along their length in the positive/negative radial directions +/−X (i.e. towards/away from the pivot axis 17). The sealing members 37a are in a state of resilient compression so that they urge the sealing lips 36a towards the bush and can relax away from the body 32a towards the pintle 11 in the positive radial direction +X to maintain engagement with the bush in the event that the bush distorts (for instance during a hard landing of the aircraft) and in doing so moves away from the body 32a in that positive radial direction +X.

As well as expanding/contracting in the radial direction +/−X, the sealing members 37a can also bend slightly away the side wall 3a, 23 (in the positive axial direction +Y) or towards the base 23 of the counterbore (in the negative axial direction −Y) to maintain engagement with the bush 13 in the event that the bush distorts (for instance during a hard landing of the aircraft) and in doing so moves relative to the lug in the axial direction, unseating from the counterbore 23. Alternatively, because the sealing lips 36a are not bonded or otherwise attached to the end face 21, the face 21 can maintain a sliding contact with the sealing lips 36a in the event that it moves in the axial direction. In this case the sealing members 37a are not required to bend towards or away from the side wall 23 to maintain contact.

Furthermore, because the sealing lips 36a are not bonded or otherwise attached to the end face 21, the face 21 can maintain a sliding contact with the sealing lips 36a in the event that the bush rotates about the pivot axis 17 so that it moves in a circumferential direction (in or out of the plane of the section).

The annular body 32a contains a metallic or plastic interleaf reinforcement ring 40a which aids handling of the sealing ring 31a and ensures that flex occurs at the protruding sealing members 37a and thus protects the body 32a from peeling away from the lug 3.

Figure 8:
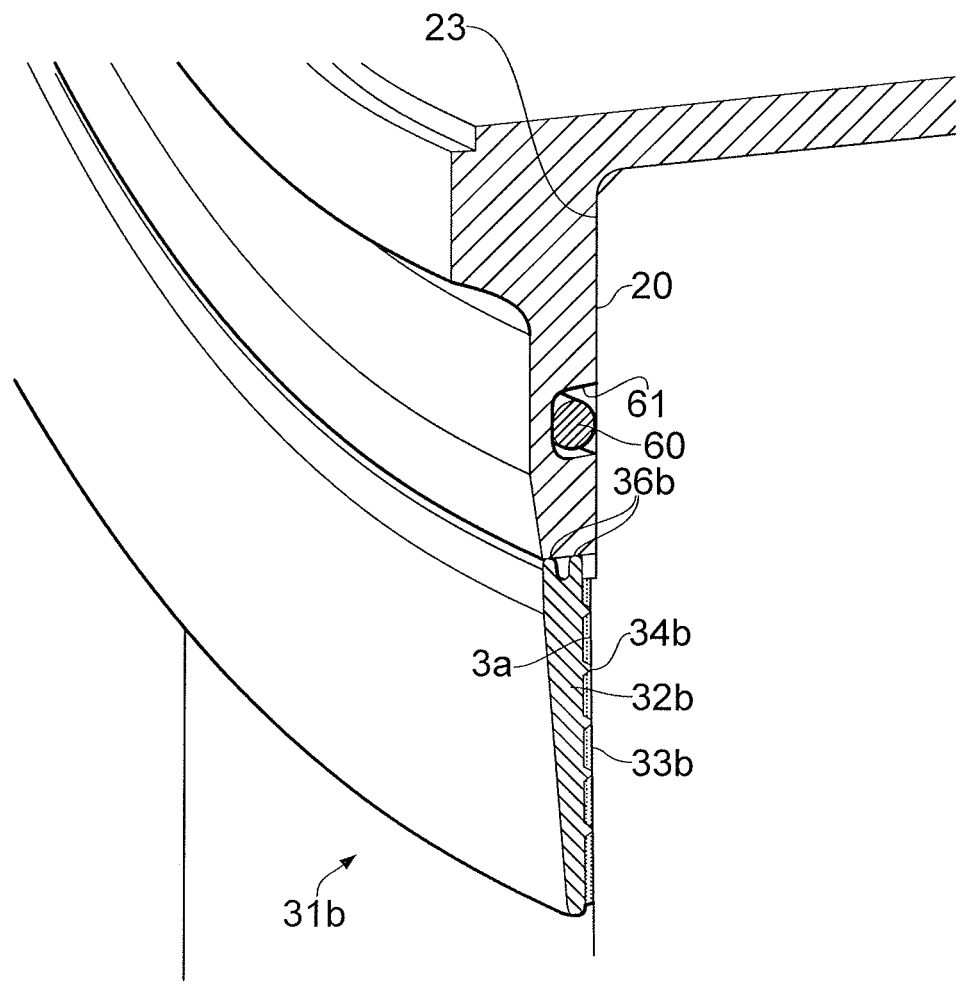
FIG. 8 is a sectional view of a sealing arrangement according to a third embodiment of the invention.

FIG. 8 is a sectional view of a sealing ring 31b according to a third embodiment of the invention. The sealing ring 31b is similar to the sealing ring 31a shown in FIG. 7. It has an annular body 32b which is bonded to the side wall 3a of the lug outside the counterbore by an adhesive layer 33b. The body 32a has five annular ribs 34b which ensure that the adhesive layer 33b has a known thickness. The sealing ring 31b also has a pair of sealing members which extend away from the body 32*b* to a pair of sealing lips 36*b* which engage the end face of the flange 20 of the bush without being attached to it.

A secondary O-ring seal 60 is provided between the flange 20 and the counterbore 23. The O-ring 60 is fitted into a groove 61 in the flange 20 and compressed between the flange 20 and the counterbore 23.

Although the invention has been described above with reference to one or more preferred embodiments, it will be appreciated that various changes or modifications may be made without departing from the scope of the invention as defined in the appended claims.

The invention claimed is:

1. A pivot joint assembly comprising: a first part with first and second side walls and a hole passing through the first part between the side walls, the exterior of the hole being defined by a bore wall; a pivot pin passing through the hole, the pivot pin defining a pivot axis; a second part which is carried by the pivot pin wherein the first or second part can rotate relative to the other part about the pivot axis; a bush comprising an annular sleeve with an inner face which engages the pivot pin and an outer face which engages the bore wall of the first part; and a sealing ring for preventing the ingress of contaminants between the bush and the first part, wherein the sealing ring has a body which is attached to the first side wall of the first part, and a sealing member which extends away from the body in a radial direction towards the pivot axis to a sealing lip which engages the bush without being attached to it, and wherein the sealing member is in a state of resilient compression so that it urges the sealing lip towards the bush and can expand away from the body in the radial direction to maintain engagement with the bush in the event that the bush moves away from the body in the radial direction.

2. The assembly of claim 1 wherein the sealing member comprises a folded part which forms a ridge between the body and the sealing lip and a groove between the ridge and the first side wall of the first part, wherein the ridge and groove flatten as the sealing member expands towards the pivot axis.

3. The assembly of claim 1 wherein the sealing member can bend away from the first side wall of the first part or maintain a sliding contact with the bush to maintain engagement with the bush in the event that the bush moves relative to the body in an axial direction parallel with the pivot axis.

4. The assembly of claim 1 wherein the sealing lip can maintain a sliding contact with the bush in the event that the bush moves relative to the body in an axial direction parallel with the pivot axis and/or in a circumferential direction around the pivot axis.

5. The assembly of claim 1 wherein the sealing member comprises a hinge which enables the sealing member to bend away from the first side wall of the first part to maintain engagement with the bush in the event that the bush moves relative to the body in an axial direction parallel with the pivot axis.

6. The assembly of claim 1 wherein the bush has a flange which extends away from the sleeve and from the pivot axis towards an end face, the flange engages the first wall of the first part, and the sealing member engages the end face of the flange of the bush without being attached to it.

7. The assembly of claim 6 further comprising a secondary sealing ring which is compressed between the flange and the first wall of the first part.

8. The assembly of claim 1 further comprising a bearing between the second part and the pivot pin which permits the second part to rotate on the bearing about the pivot pin.

9. The assembly of claim 1 wherein the body is bonded to the first side wall.

10. The assembly of claim 9 wherein the body is bonded to the first side wall by a layer of adhesive.

11. The assembly of claim 1 wherein the first side wall is formed with a counterbore with a base and a step; the body is attached to the first side wall outside the counterbore; the sealing member extends away from the body across the step; and a gap is present between the sealing member and the base of the counterbore.

12. The assembly of claim 11 wherein the sealing member does not engage the first side wall outside the counterbore.

13. The assembly of claim 1 wherein the first side wall of the first part faces towards the second part and the second side wall of the first part faces away from the second part.

14. A method of assembling a pivot joint assembly, the method comprising:
   a. providing a first part with first and second side walls and a hole passing through the first part between the side walls, the exterior of the hole being defined by a bore wall;
   b. passing a pivot pin through the hole, the pivot pin defining a pivot axis;
   c. providing a second part which is carried by the pivot pin wherein the first or second part can rotate relative to the other part about the pivot axis;
   d. providing a bush comprising an annular sleeve with an inner face which engages the pivot pin and an outer face which engages the bore wall of the first part; and
   e. attaching a body of a sealing ring to the first side wall of the first part, the sealing ring comprising a sealing member which extends away from the body in a radial direction towards the pivot axis to a sealing lip which engages the bush without being attached to it; and
   f. placing the sealing member in a state of resilient compression so that it urges the sealing lip towards the bush and can expand away from the body in the radial direction to maintain engagement with the bush in the event that the bush moves away from the body in the radial direction.

15. The method of claim 14 wherein the sealing member is placed in a state of resilient compression by stretching it over an insertion tool before step e); and wherein the body of the sealing ring is attached to the first side wall in step e) by pressing the body of the sealing ring onto the first side wall with the insertion tool.

\* \* \* \* \*